(12) United States Patent
Kong et al.

(10) Patent No.: US 7,195,818 B2
(45) Date of Patent: *Mar. 27, 2007

(54) SEALABLE MULTI-LAYER OPAQUE FILM

(75) Inventors: Dan-Cheng Kong, Fairport, NY (US); Michael D. Cleckner, Naples, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 425 days.

This patent is subject to a terminal disclaimer.

(21) Appl. No.: 10/135,321

(22) Filed: May 1, 2002

(65) Prior Publication Data

US 2003/0207137 A1    Nov. 6, 2003

(51) Int. Cl.
| B32B 25/08 | (2006.01) |
| B32B 27/08 | (2006.01) |
| B32B 27/18 | (2006.01) |
| B32B 27/30 | (2006.01) |
| B32B 27/32 | (2006.01) |

(52) U.S. Cl. ............... 428/349; 428/346; 428/347; 428/355 EN; 428/355 AC; 428/500; 428/515; 428/516; 428/343; 428/520; 428/522; 428/523; 428/910; 525/63; 525/69; 525/88; 525/92 R; 525/92 F; 525/165; 525/177; 525/178; 525/184; 525/191; 525/220; 525/221; 525/240; 525/241

(58) Field of Classification Search ............... 428/343, 428/346, 347, 349, 355 AC, 500, 515, 516, 428/520, 522, 523, 910, 304.9, 315.5, 315.9, 428/317.9, 318.4, 319.3, 319.9, 320.2
See application file for complete search history.

(56) References Cited

U.S. PATENT DOCUMENTS

| 2,759,913 A | 8/1956 | Hulse |
| 3,753,769 A | 8/1973 | Steiner |
| 4,194,039 A | 3/1980 | Mueller |
| 4,214,039 A | 7/1980 | Steiner et al. |
| 4,223,115 A | 9/1980 | Zalucha et al. |
| 4,308,189 A | 12/1981 | Moritani et al. |
| 4,333,968 A | 6/1982 | Nahmias |
| 4,377,616 A | 3/1983 | Ashcraft et al. |
| 4,386,129 A | 5/1983 | Jacoby |
| 4,421,823 A | 12/1983 | Theisen et al. |
| 4,439,493 A | 3/1984 | Hein et al. |
| 4,447,494 A | 5/1984 | Wagner, Jr. et al. |
| 4,546,140 A | 10/1985 | Shih |
| 4,572,854 A | 2/1986 | Dallmann et al. |
| 4,582,752 A | 4/1986 | Duncan |
| 4,610,914 A | 9/1986 | Newsome |
| 4,615,926 A | 10/1986 | Hsu et al. |
| 4,629,657 A | 12/1986 | Gulati et al. |
| 4,632,869 A | 12/1986 | Park |
| 4,652,489 A | 3/1987 | Crass |
| 4,677,017 A | 6/1987 | DeAntonis et al. |
| RE32,542 E * | 11/1987 | Shiga et al. ............ 428/512 |
| 4,704,314 A | 11/1987 | Hsu et al. |
| 4,705,828 A * | 11/1987 | Matsumoto et al. ...... 525/232 |
| 4,716,061 A | 12/1987 | Winter |
| 4,755,419 A | 7/1988 | Shah |
| 4,758,462 A | 7/1988 | Park |
| 4,801,640 A | 1/1989 | Dallmann et al. |
| 4,828,928 A | 5/1989 | Shah |
| 4,853,602 A | 8/1989 | Hommes et al. |
| 4,865,908 A | 9/1989 | Liu et al. |
| 4,879,177 A | 11/1989 | Boice |
| 4,906,517 A | 3/1990 | Akao et al. |
| 4,927,689 A | 5/1990 | Markiewicz |
| 4,927,690 A | 5/1990 | Welsh |
| 4,938,683 A | 7/1990 | Boice |
| 4,946,743 A | 8/1990 | Winter |
| 4,961,992 A | 10/1990 | Balloni et al. |
| 4,975,469 A | 12/1990 | Jacoby et al. |
| 5,019,447 A | 5/1991 | Keller |
| 5,023,143 A | 6/1991 | Nelson |
| 5,057,177 A | 10/1991 | Balloni et al. |
| 5,064,716 A | 11/1991 | Chou et al. |
| 5,126,197 A | 6/1992 | Schinkel et al. |
| 5,128,205 A | 7/1992 | Butler |
| 5,134,174 A | 7/1992 | Xu et al. |
| 5,151,309 A | 9/1992 | Dollinger |
| 5,169,712 A | 12/1992 | Tapp |

(Continued)

FOREIGN PATENT DOCUMENTS

CN    1131611 A    9/1996

(Continued)

OTHER PUBLICATIONS

F. Möller, Houben-Weyl, vol. 11/1 (1957), pp. 277-280.

(Continued)

*Primary Examiner*—Vivian Chen
(74) *Attorney, Agent, or Firm*—D. M. Tyus; R. F. James

(57) ABSTRACT

A sealable multi-layer opaque film. In particular, a sealable multi-layer opaque film that is moisture permeable and water resistant. The sealable multi-layer opaque film is an oriented multilayer film with a core layer comprising an orientation-enhancing polymer, a polypropylene homopolymer and a beta crystal nucleator of polypropylene and at least one sealable skin layer.

30 Claims, No Drawings

U.S. PATENT DOCUMENTS

| | | | |
|---|---|---|---|
| 5,176,953 A | 1/1993 | Jacoby | |
| 5,194,324 A | 3/1993 | Poirier | |
| 5,209,972 A | 5/1993 | Super et al. | |
| 5,230,963 A | 7/1993 | Knoerzer | |
| 5,231,126 A * | 7/1993 | Shi et al. | 524/296 |
| 5,236,963 A | 8/1993 | Jacoby et al. | |
| 5,254,631 A | 10/1993 | Yamamoto et al. | |
| 5,296,530 A | 3/1994 | Bors et al. | |
| 5,310,584 A | 5/1994 | Jacoby et al. | |
| 5,317,035 A | 5/1994 | Jacoby | |
| 5,380,587 A | 1/1995 | Musclow et al. | |
| 5,382,473 A | 1/1995 | Musclow et al. | |
| 5,407,751 A | 4/1995 | Genske et al. | |
| 5,468,440 A | 11/1995 | McAlpin et al. | |
| 5,491,188 A | 2/1996 | Ikeda et al. | |
| 5,498,659 A | 3/1996 | Esser | |
| 5,516,475 A | 5/1996 | Wilson | |
| 5,521,266 A | 5/1996 | Lau | |
| 5,525,662 A | 6/1996 | Lavoie et al. | |
| 5,529,834 A | 6/1996 | Tsai et al. | |
| 5,547,764 A | 8/1996 | Blais et al. | |
| 5,585,193 A | 12/1996 | Josephy et al. | |
| 5,591,530 A | 1/1997 | Warner et al. | |
| 5,594,070 A | 1/1997 | Jacoby et al. | |
| 5,617,707 A | 4/1997 | Simmons | |
| 5,627,226 A | 5/1997 | Lustiger et al. | |
| 5,662,985 A | 9/1997 | Jensen et al. | |
| 5,667,902 A | 9/1997 | Brew et al. | |
| 5,681,922 A * | 10/1997 | Wolfschwenger et al. | 528/486 |
| 5,716,715 A | 2/1998 | Degrassi et al. | |
| 5,716,998 A | 2/1998 | Munakata et al. | |
| 5,723,527 A * | 3/1998 | Sadatoshi et al. | 524/451 |
| 5,725,962 A | 3/1998 | Bader et al. | |
| 5,733,615 A | 3/1998 | Rackovan et al. | |
| 5,753,363 A | 5/1998 | Bader et al. | |
| 5,789,123 A | 8/1998 | Cleckner et al. | |
| 5,811,121 A | 9/1998 | Wu et al. | |
| 5,858,552 A | 1/1999 | Bader et al. | |
| 5,885,721 A | 3/1999 | Su et al. | |
| 5,891,555 A | 4/1999 | O'Brien | |
| 5,895,694 A | 4/1999 | Zavadsky et al. | |
| 5,919,547 A | 7/1999 | Kocher et al. | |
| 5,972,496 A | 10/1999 | Bader et al. | |
| 6,004,682 A | 12/1999 | Rackovan et al. | |
| 6,005,034 A | 12/1999 | Hayashida et al. | |
| 6,025,059 A | 2/2000 | McGee et al. | |
| 6,033,758 A | 3/2000 | Kocher et al. | |
| 6,072,005 A | 6/2000 | Kobylivker et al. | |
| 6,177,144 B1 | 1/2001 | Kranig et al. | |
| 6,183,856 B1 | 2/2001 | Amon | |
| 6,194,060 B1 | 2/2001 | Amon et al. | |
| 6,218,013 B1 | 4/2001 | Wood et al. | |
| 6,231,975 B1 | 5/2001 | Kong et al. | |
| 6,235,823 B1 | 5/2001 | Ikeda et al. | |
| 6,242,525 B1 * | 6/2001 | Raetzsch et al. | 524/525 |
| 6,248,442 B1 | 6/2001 | Kong et al. | |
| 6,268,062 B1 | 7/2001 | DeMeuse | |
| 6,287,700 B1 | 9/2001 | Kong et al. | |
| 6,297,328 B1 | 10/2001 | Collins et al. | |
| 6,303,233 B1 | 10/2001 | Amon et al. | |
| 6,306,518 B1 | 10/2001 | Shah et al. | 428/516 |
| 6,310,140 B1 * | 10/2001 | Raetzsch et al. | 525/191 |
| 6,316,067 B1 | 11/2001 | Edwards et al. | |
| 6,339,123 B1 * | 1/2002 | Raetzsch et al. | 524/521 |
| 6,514,625 B1 | 2/2003 | DeMeuse | 428/516 |
| 6,596,814 B2 * | 7/2003 | Kim et al. | 525/191 |
| 6,607,834 B2 | 8/2003 | Davis et al. | 428/457 |
| 6,632,850 B2 * | 10/2003 | Hughes et al. | 521/82 |
| 6,632,885 B2 | 10/2003 | Morizono et al. | 525/191 |
| 6,828,019 B2 * | 12/2004 | Kong et al. | 428/354 |
| 2002/0029844 A1 * | 3/2002 | Davidson et al. | 156/244.11 |
| 2002/0146551 A1 | 10/2002 | Freedman et al. | 428/220 |
| 2002/0187361 A1 | 12/2002 | Amon | 428/516 |
| 2002/0197463 A1 | 12/2002 | Davidson et al. | 428/220 |
| 2003/0207131 A1 | 11/2003 | Nakata et al. | 428/447 |
| 2003/0207138 A1 | 11/2003 | Kong et al. | 428/515 |

FOREIGN PATENT DOCUMENTS

| | | |
|---|---|---|
| CN | 1282750 A | 2/2001 |
| DE | 3610644 A | 3/1986 |
| DE | 4420991 A1 | 6/1994 |
| EP | 0 632 095 A2 | 1/1995 |
| EP | 0632095 | 1/1995 |
| EP | 0 682 066 | 11/1995 |
| EP | 0790275 A1 | 8/1997 |
| EP | 0589033 B1 | 3/1998 |
| EP | 0 865 909 A1 | 9/1998 |
| EP | 0 865 910 A1 | 9/1998 |
| EP | 0 865 911 A1 | 9/1998 |
| EP | 0 865 912 A1 | 9/1998 |
| EP | 0 865 913 A1 | 9/1998 |
| EP | 0 865 914 A1 | 9/1998 |
| EP | 0865909 | 9/1998 |
| EP | 0865911 | 9/1998 |
| EP | 0887375 A1 | 12/1998 |
| EP | 0962489 A2 | 12/1999 |
| EP | 0967671 A2 | 12/1999 |
| EP | 0492942 B1 | 2/2000 |
| EP | 0790262 B1 | 5/2000 |
| EP | 0557721 B1 | 10/2000 |
| EP | 0632095 B1 | 9/2001 |
| EP | 1167404 A1 | 1/2002 |
| JP | 62-195030 A | 8/1987 |
| JP | 03-166234 A | 7/1991 |
| JP | 03-187742 A | 8/1991 |
| JP | 03-187746 A | 8/1991 |
| JP | 04-122736 A | 4/1992 |
| JP | 05-255551 A | 10/1993 |
| JP | 07-148837 | 6/1995 |
| JP | 07-148837 A | 6/1995 |
| JP | 07-149967 A1 | 6/1995 |
| JP | 08-067760 | 3/1996 |
| JP | 08-67760 A | 3/1996 |
| JP | 08-142286 A | 6/1996 |
| JP | 08-183873 A | 7/1996 |
| JP | 09-176352 | 7/1997 |
| JP | 09-176352 A | 7/1997 |
| JP | 09/194650 | 7/1997 |
| JP | 09-194650 A | 7/1997 |
| JP | 9510129 | 10/1997 |
| WO | WO 95/24837 | 9/1995 |
| WO | WO 97/10300 | 3/1997 |
| WO | WO 97/11115 | 3/1997 |
| WO | WO 97/22470 | 6/1997 |
| WO | WO 01/98372 | 12/2001 |
| WO | WO 01/98409 | 12/2001 |
| ZA | 970523 | 1/1997 |

OTHER PUBLICATIONS

Turner Jones, et al., Makromol. Chem., 75, 134-158, (1964).
Chu, et al. Polymer, 36 (13), 2523, (1995).
Chu, et al., Polymer, 35 (16), 3442, 1994.
Shi, et al., Makromol. Chem., 190, 907-913, (1989).
Yoshida, Fujiwara & Asano, Polymer, 24 (7), 925, (1983).
Asano, Fujiwara, Yoshida, Polymer, 11 (5), 383-390, (1979).
Asana & Fujiwara, Polymer, 19 (1), 99, (1978).
A. Duswalt, Am. Chem. Soc. Div. Org. Coat., 30(2), 93, (1970).
F. Binsbergen, et al., Polymer, 9, 23, (1968).
D. Morrow, J., Macromole. Sci-Phys., B3 (1), 53, (1969).
V. Leugering, Makromol. Chemie, 109, 204-216, (1967).

* cited by examiner

SEALABLE MULTI-LAYER OPAQUE FILM

BACKGROUND OF THE INVENTION

The present invention relates to a sealable multi-layer opaque film. In particular, the present invention relates to a sealable multi-layer opaque film that is moisture permeable and water resistant. The sealable multi-layer opaque film is an oriented multilayer film with a core layer, comprising an orientation-enhancing polymer, a polypropylene homopolymer and a beta crystal nucleator of polypropylene, and at least one sealable skin layer.

Multilayer films are commonly used in the food industry for the packaging of various types of foods. Generally, a barrier to oxygen and moisture are required. It is common practice to employ a multilayer film having two or more polymeric layers wherein one of the layers is known to be an effective heat seal layer. However, for certain type of foods, such as bakery goods, for example, apple pie, moisture release after packaging is desirable. Existing packaging materials for such uses include glassine paper with a sealant coating. However, glassine paper does not have enough opacity to shield light and glassine paper is expensive. Additionally, glassine paper tends to tear during packaging processing, which causes down time. The mechanical strength of glassine paper also degrades when it is dipped in water or subject to a high moisture environment. Current sealable opaque thermoplastic films for packaging applications do not have sufficient moisture permeability to meet the food industry requirements.

Additionally, in the packaging of certain types of foodstuff products, opacity is a highly desirable property to protect the packaged product from deterioration caused by exposure to light. Typically, such opaque polymeric packaging films are multi-layer films comprising an opaque, thermoplastic polymeric core layer having one or more skin layers thereon. The skin layers contribute various desirable characteristics to the packaging film, such as heat sealability, improved appearance, enhanced machine handling capabilities, and the like.

Park et al, U.S. Pat. No. 4,632,869, discloses an opaque, biaxially oriented film structure having a polymer matrix with strata of cavitated voids, in which the voids contain spherical void-initiating particles of polybutylene terephthalate (PBT). The structure may also include thermoplastic skin layers, and the film can also include pigments such as $TiO_2$ or colored oxides.

Park et al, U.S. Pat. No. 4,758,462, discloses an opaque, biaxially oriented film with a cavitated core layer and transparent skin layers. Colored light absorbing pigments such as carbon black or iron oxide are added to the core and/or the skins to decrease light transmission through the film.

Crass et al, U.S. Pat. No. 4,652,489 discloses an oriented, sealable, opaque polyolefin multi-layer film with a core layer containing vacuoles or voids, a sealable surface layer, and a non-sealable surface layer which incorporates a slip agent such as a polydiorganosiloxane.

Amon et al, U.S. Pat. No. 6,194,060, discloses an opaque, oriented polymeric film structure, suitable for food packaging, comprising: (a) a core layer containing a thermoplastic polymeric matrix material which has a first surface and a second surface, the core layer having a plurality of voids, substantially all or all of the voids being free from a void-initiating particle and at least some of the voids being interconnected with an adjacent void in the polymeric matrix material, the number of voids not containing a void-initiating particle being sufficient to impart a significant degree of opacity to the film structure; and (b) at least one outer or skin layer containing a thermoplastic polymeric material and an effective amount of a nucleating agent to suppress cavitation in said at least one outer or skin layer. The film structure is stated to have a smooth surface and to be tailorable to provide a controlled permeability.

Amon et al, U.S. Pat. No. 6,303,233, discloses a uniaxially heat-shrinkable, biaxially oriented, multilayer film having a polypropylene-containing core layer containing at least 70 wt. % of the multilayer film and at least one polyolefin-containing skin layer adjacent the core layer, which is prepared by biaxially orienting a coextrudate and thereafter orienting the coextrudate by stretching 10 to 40% in the machine direction. The core layer contains isotactic polypropylene, a modifier which reduces the crystallinity of the polypropylene-containing core layer and a nucleating agent. The modifiers include atactic polypropylene, syndiotactic polypropylene, ethylene-propylene copolymer, propylene-butene-1 copolymer, ethylene-propylene-butene-1 terpolymer, and linear low density polyethylene. The nucleating agent is said to improve long term dimensional stability. The skin layer can be high density polyethylene on both sides or high density polyethylene on one side and isotactic polypropylene on the other side.

Amon, U.S. Pat. No. 6,183,856, discloses a process for forming film structures which have a plurality of voids, at least some of the voids not containing a void-initiating particle and at least some of the voids being interconnected with an adjacent void in the polymeric matrix material, with the number of voids being sufficient to impart a significant degree of opacity in the film structure.

Davidson et al, EP0865909, discloses biaxially oriented heat shrinkable polyolefin films for use as labels, having a layer of a polypropylene-based resin with microvoids therein. The microvoids having been formed by stretching a web containing the beta form of polypropylene.

Davidson et al, EP0865910, and Davidson et al, EP0865912, disclose biaxially oriented polyolefin opaque films having a thickness of not more than 50 μm having a layer of a polypropylene-based resin with microvoids therein. The microvoids having been formed by stretching a web containing the beta form of polypropylene at an area stretch ration of at least 15:1.

Davidson et al, EP0865911, discloses biaxially oriented polyolefin films, including microvoids formed by stretching polypropylene based resin which contains the beta form of polypropylene, and a heat seal layer. The heat seal becomes transparent upon heating.

Davidson et al, EP0865913, discloses biaxially oriented heat shrinkable polyolefin films having a layer of a polypropylene-based resin with microvoids therein. The microvoids having been formed by stretching a web containing the beta form of polypropylene, the film having a shrinkage after 10 minutes at 130° C. of at least 10% in at least one direction.

Davidson et al, EP0865914, discloses biaxially oriented high gloss polyolefin films having a layer of a polypropylene-based resin with microvoids therein and at least one olefin copolymer outer layer thereon. The microvoids having been formed by stretching a web containing the beta form of polypropylene.

Jacoby et al, U.S. Pat. No. 5,594,070 discloses oriented microporous films prepared from polyolefin resin compositions comprising an ethylene-propylene block copolymer having an ethylene content of about 10 to about 50 wt. %, a propylene homopolymer or random propylene copolymer having up to about 10 wt. % of a comonomer of ethylene or an α-olefin of 4 to 8 carbon atoms, and components selected from a low molecular weight polypropylene, a beta-spherulite nucleating agent and an inorganic filler. The microporous films are said to have improved breathability, strength, toughness and break elongation. However, the films of Jacoby have a tendency to exhibit pink color when red dye (beta-spherulite nucleating agent) concentration is higher than 50 ppm. If the concentration of red dye (beta-spherulite nucleating agent) is lower than 50 ppm, then it is difficult to obtain consistent opacity due to poor dispersion uniformity.

Jacoby et al, U.S. Pat. No. 5,310,584, discloses a thermoformable sheet comprising a resinous polymer of propylene and an effective amount of a beta-spherulite nucleating agent, a process for making the sheet and articles thermoformed from the sheet.

Xu et al, U.S. Pat. No. 5,134,174, discloses polypropylene microporous films having a porosity of 30–35%, an average pore size of 200–800 Å, a permeation coefficient for nitrogen of $1-5 \times 10^{-3}$ ml/cm sec atm and a tensile strength of greater than 60 MPA in all directions within the film plane. The films are prepared by the consecutive steps of biaxial stretching a non-porous starting film of high beta-crystal content and heat setting the stretched film.

Kobylivker et al, U.S. Pat. No. 6,072,005 discloses a breathable film, having certain physical and barrier properties, made from a stretched impact modified polyolefin matrix and a particulate filler. The impact modified polyolefin matrix includes at least one impact polypropylene copolymer, alone or in combination with other polymers. The film, and laminates including the film, are stated to provide moisture breathability and barrier to penetration by liquids. Disclosed uses for laminates including the film include diaper outercovers and other applications requiring breathability and resistance to penetration by liquids.

BRIEF SUMMARY OF THE INVENTION

An object of the present invention is to provide a sealable multi-layer opaque film for use in a packaging substrate with the advantages of:
1. Controlled moisture permeability at a high level;
2. Water resistant;
3. Sealable;
4. High surface energy for ink printability; and
5. Good opacity to shield light.

The present invention relates to a sealable multi-layer opaque film that has high moisture permeability and is water resistant. The sealable multi-layer film is also sealable at low temperatures. The sealable multi-layer opaque film is an oriented multilayer film with a core layer comprising an orientation-enhancing polymer, a polypropylene homopolymer and at least one beta crystal nucleator of polypropylene and at least one sealable skin layer. The sealable multi-layer film has uniform opacity due to uniform dispersion of beta crystal nucleator of polypropylene.

The opaque film of the present invention is different from the conventional opaque sealable polypropylene films. Conventional opaque polypropylene films are cavitated by organic polymers or inorganic fillers. In the present invention, beta-crystal growth during polypropylene film casting is controlled, followed by orientation, to create the high permeability opaque sealable film.

DETAILED DESCRIPTION OF THE INVENTION

Preferably the water vapor transmission rate (WVTR) of the sealable multi-layer opaque film, as measured by ASTM F1249, is greater than 4.0 g/m²/day. More preferably, the WVTR is at least 15 g/m²/day. Most preferably, the WVTR is at least 50 g/m²/day.

Preferably the light transmission of the sealable multi-layer opaque film, as measured by ASTM D1003, is less than 35%. More preferably, the light transmission is less than 30%. Most preferably, the light transmission is less than 25%.

The sealable multi-layer opaque film being water resistant means the mechanical strength is not affected when the film is dipped into water or a high moisture environment.

Total film thickness of the sealable multi-layer opaque film is about 15 μm to about 250 μm. Preferably, the film thickness is about 18 μm to about 100 μm. Most preferably, the film thickness is about 20 μm to 80 μm.

The core layer comprises an orientation-enhancing polymer, a polypropylene homopolymer and a beta crystal nucleator of polypropylene.

Preferably, the orientation-enhancing polymer comprises an (isotactic propylene)-ethylene heterophasic copolymer and at least one polymer selected from the group consisting of an impact polypropylene polymer, an impact polypropylene copolymer, an ethylene-(isotactic propylene) rubber modified polypropylene, a metallocene isotactic polypropylene, an isotactic polypropylene grafted with elastomer, a maleated-isotactic polypropylene, a blend of an isotactic polypropylene and a syndiotactic polypropylene, a blend of an isotactic polypropylene and an atactic polypropylene, a blend of an isotactic polypropylene and an acrylic elastomer, a blend of an isotactic polypropylene and an alkenic elastomer, a blend of an isotactic polypropylene, a polyethylene, and an ethylene-propylene rubber, a blend of an isotactic polypropylene and a polyisobutylene, a blend of an isotactic polypropylene and a styrenic elastomer, a blend of an isotactic polypropylene and a metallocene isotactic polypropylene copolymer, and a blend of an isotactic polypropylene and an isotactic propylene copolymer, and mixtures thereof. Preferably, the orientation-enhancing polymer is not an ethylene-propylene block copolymer.

The orientation-enhancing polymer assists in making the biaxial tenter frame orientation for the opaque film of this invention. Without the orientation-enhancing polymer, it is difficult to make a reliable biaxial oriented opaque film with only polypropylene loaded with beta-crystal nucleator, due to film split and high mechanical stress in the TD orientation. The addition of orientation-enhancing polymer in the core layer improves the tenter frame orientation stability especially above 4 times orientation in the transverse direction without film split and without sacrificing the opacity.

The core layer preferably comprises 1 to 99 wt. % polypropylene and 99 to 1 wt. % orientation-enhancing polymer (based on total polymers) and the beta crystal nucleator for polypropylene. More preferably, the core layer comprises 10 to 90 wt. % polypropylene homopolymer and 90 to 10 wt. % orientation-enhancing polymer (based on total polymers). Most preferably, the core layer comprises 30 to 70 wt. % polypropylene homopolymer and 70 to 30 wt. % orientation-enhancing polymer (based on total polymers).

More preferably, the core layer is made from an impact polypropylene masterbatch with a beta crystal nucleator of polypropylene or the core layer is made from an impact polypropylene masterbatch with a beta crystal nucleator of polypropylene and an isotactic polypropylene. The core layer may also be made from: An (isotactic propylene)-ethylene heterophasic copolymer masterbatch with a beta crystal nucleator of polypropylene and an isotactic polypropylene; An impact polypropylene masterbatch with a beta crystal nucleator of polypropylene and a metallocene isotactic polypropylene; or An (isotactic propylene)-ethylene heterophasic copolymer, ethylene-propylene-ethylidene norbornene elastomer, isotactic polypropylene masterbatch with a beta crystal nucleator of polypropylene and an isotactic polypropylene that has a different m-pentad than the isotactic polypropylene in the isotactic polypropylene masterbatch.

See, for example, Example 11, where polypropylene PP4612 is an isotactic polypropylene with an m-pentad of about 92% and the polypropylene in BEPOL 022SP has an m-pentad of 88%.

The core layer thickness is preferably at least 70% of the whole film thickness.

The orientation-enhancing polymer may be a blend comprising alpha-olefin-propylene elastomer and (isotactic propylene)-ethylene heterophasic copolymer. The (isotactic propylene)-ethylene heterophasic copolymer is generally produced by two reactors. The isotactic propylene homopolymer matrix is made with 60 to 95% by weight based on the weight of the whole final polymer in the first reactor, and then transferred to the second reactor where ethylene and propylene are polymerized to create ethylene-propylene elastomer about 5 to 40% by weight based on the weight of the whole final polymer, dispersed in the homopolymer phase. The alpha-olefin-propylene elastomer comprises ethylene-propylene elastomer, butylene-propylene elastomer, pentene-propylene elastomer, hexene-propylene elastomer, octene-propylene elastomer, ethylene-propylene-ethylidene norbornene elastomer and ethylene-propylene-vinyl norbornene elastomer.

Preferably, the polypropylene homopolymer is an isotactic polypropylene. The isotactic polypropylene preferably has an m-pentad greater than 85% by NMR spectroscopy measurement. A mixture of isotactic polypropylenes may be used, preferably, the mixture comprises at least two polypropylene polymers having different m-pentads. Preferably, the difference between m-pentads is at least 1%.

Polypropylene is capable of crystallizing in several crystal forms. The alpha or monoclinic form of polypropylene is the most stable and prevalent form. Without control, the beta or hexagonal from may be found in commercially available polypropylene, but usually at low levels. The beta form of polypropylene may be produced more effectively by using a beta nucleating agent. As beta crystal nucleators of polypropylene, any know types of beta nucleators may be used.

Jacoby, U.S. Pat. No. 4,386,129, and Jacoby, U.S. Pat. No. 4,975,469, disclose a process of forming a film containing nucleating agents to produce beta- from spherulites and then selectively extracting the beta-spherulites. Both Jacoby patents disclose quinacridone compounds, bisodium salts of o-phthalic acids, aluminum salts of 6-quinizarin sulfonic acid and isophthalic and terephthalic acids as beta nucleating agents.

Wolfschwenger et al, U.S. Pat. No. 5,681,922, discloses the use of dicarboxylic acid salts of metals of the second main group of the Periodic Table as beta nucleating agents.

A two component beta nucleators may be used. For example, Shi et al, U.S. Pat. No. 5,231,126, discloses the use of a mixture of a dibasic organic acid and an oxide, hydroxide or salt of a metal of group IIA of the Periodic Table.

Ikeda et al, U.S. Pat. No. 5,491,188, Ikeda et al, U.S. Pat. No. 6,235,823, and Ikeda et al, EP 0632095, discloses the use of certain types of amide compounds as beta nucleators.

Hayashida et al, U.S. Pat. No. 6,005,034, discloses various types of beta nucleators.

Jacoby, U.S. Pat. No. 4,386,129, Jacoby, U.S. Pat. No. 4,975,469, Wolfschwenger et al, U.S. Pat. No. 5,681,922, Shi et al, U.S. Pat. No. 5,231,126, Ikeda et al, U.S. Pat. No. 5,491,188, Ikeda et al, U.S. Pat. No. 6,235,823, Ikeda et al, EP 0632095, and Hayashida et al, U.S. Pat. No. 6,005,034, are herein incorporated by reference.

The beta-nucleating agent is preferably a two component beta nucleator formed by the mixing of Components A and B. Component A is an organic dibasic acid, such as pimelic acid, azelaic acid, o-phthalic acid, terephthalic and isophthalic acid and the like. Component B is an oxide, hydroxide or an acid salt of a Group II metal e.g. magnesium, Calcium, Strontium and Barium. The acid salt of Component B may come from inorganic or organic acid such as carbonate, stearate etc. Component B may also be one of the additives of polypropylene, that already is present in the polypropylene material.

The proportion of component A is in the range of 0.0001–5% by weight, most preferably 0.01–1 wt %, the proportion of component B is 0.0002–5% by weight, most preferably 0.05–1%, during mixing.

Preferably, the beta crystal nucleator of polypropylene is not a red dye.

Preferably, the beta nucleators are incorporated into the resinous polymer before the film is formed. More preferably, the beta nucleators are combined with the impact polypropylene polymer or the polypropylene homopolymer in the form of a master batch before the sheet is formed.

The amount of beta nucleators used should be enough to obtain the desired degree of void formation upon stretching. The amount of beta nucleators may also be used to control the degree of opacity. Preferred amounts of beta nucleators are from 0.0002 to 8 wt. % based on the weight of polypropylene, more preferably 0.005 to 2 wt. %, and 0.01 to 2 wt. %.

The sealable skin layer of the present invention can be in direct contact with the core layer or may be an outer layer on at least one intermediate layer. The sealable skin layer and any intermediate layers which may be present preferably comprise a polyolefin. Such polyolefin layers include polymers containing units derived from one or more of ethylene, propylene, butene and higher aliphatic alpha olefins, and blends thereof. Other polymeric materials which can be used for these layers include, for example, acrylic polymers, polyolefins extended or reacted with carboxylic acids and derivatives thereof (e.g. acid ionomers and anhydrides). The sealable skin layer is a heat sealable layer.

Preferably the sealable skin layer comprises a polymer selected from the group consisting of an ethylene-propylene-butene-1 terpolymer, an (isotactic propylene)-alpha olefin copolymer, an (syndiotactic propylene)-alpha olefin copolymer, an ethylene vinylacetate copolymer (EVA), an ethylene methacrylic acid copolymer (EMA), an ethylene acrylic acid copolymer (EAA), an ethylene methylacrylate acrylic acid terpolymer (EMAAA), an ethylene alkyl acrylate copolymer, an ionomer, such as ethylene-alkyl acrylate-acrylic acid Zn salt or Na salt, a metallocene plastomer, a very low density polyethylene (VLDPE), for example, having a density of 0.89 to 0.915 g/cc, an ethylene-(methyl acrylate)-(glycidyl methacrylate) terpolymer, and an ethylene-(glycidyl methacrylate) copolymer.

Most preferably, the sealable skin layer is an ethylene-vinylacetate copolymer, an ethylene-propylene-butene-1 terpolymer or a metallocene catalyzed plastomer.

In order to obtain a heat seal strength greater than 200 g/in (crimp seal strength @ 20 psi, ¾ second dwell time) at a heat seal temperature below 82° C. for conventional oriented opaque polypropylene films, a coating or lamination with a low temperature seal polymer is normally applied on the white opaque film surface, after the oriented opaque polypropylene film is made. However, the sealable multi-layer opaque film of the present invention is able to provide a seal at heat seal temperatures below 82° C. (including 71° C. and below and 66° C. and below) for oriented opaque polypropylene film by a coextrusion method, without using a later applied coating or lamination.

Preferably, the sealable multi-layer opaque film has a seal strength of above 230 g/in, more preferably, a seal strength of above 300 g/in.

In a preferable embodiment, the side of the core layer opposite to the sealable skin layer may contain an outer skin layer.

The outer skin layer preferably comprises at least one polymer selected from the group consisting of an impact polypropylene polymer, a polypropylene homopolymer, polypropylene copolymer, such as propylene-ethylene copolymer, a metallocene polypropylene, a metallocene isotactic propylene copolymer and an (isotactic propylene)-ethylene heterophasic copolymer. The outer skin layer may optionally contain a beta crystal nucleator of polypropylene.

Preferably, the outer skin layer comprises an impact polypropylene polymer, a polypropylene homopolymer and a beta crystal nucleator of polypropylene or an impact polypropylene polymer and a beta crystal nucleator of polypropylene. The outer skin layer may comprise an (isotactic propylene)-ethylene heterophasic copolymer and a beta crystal nucleator of polypropylene.

The outer skin layer may be the same blend as the core layer or may comprise a different blend of components. Preferably, the outer skin layer comprises an (isotactic propylene)-ethylene heterophasic copolymer and a beta crystal nucleator of polypropylene or the outer skin layer is made from an impact polypropylene masterbatch with a beta crystal nucleator of polypropylene.

The outer skin layer may also be surface treated by any known method, such as by corona, flame or plasma, to be a printable layer.

As discussed above, the sealable multi-layer opaque film of the present invention may be a two layer film (a core layer (B) and a sealable skin layer (C)) ("B/C") or a three layer film (a core layer (B), a sealable skin layer (C) and an outer skin layer (C)) ("A/B/C"). The sealable multi-layer opaque film of the present invention may also comprise four layers, five layers or more. For example, the sealable multi-layer opaque film of the present invention may include multiple core layers, multiple sealable skin layers and multiple outer skin layers and other types of layers. Such as A/B/B/D and A/B/C/D layer arrangements.

The sealable multi-layer opaque film may be uniaxially oriented at from 3 to 10 times of orientation ratio. The sealable multi-layer opaque film may be biaxially oriented from 3 to 6 times of orientation ratio in the machine direction (MD) and 4 to 10 times of orientation ratio in the transverse direction (TD). The MD and TD orientations may be performed sequentially or simultaneously by the tenter frame orientation method.

The sealable multi-layer opaque film may be made by any known method, preferably by coextrusion of the layers.

Separate from the intermediate layer between the core layer and the sealant skin layer, the sealable multi-layer opaque film may also contain one or more other intermediate layers. For example, the sealable multi-layer opaque film may contain an intermediate layer between the core layer and the outer layer.

One preferable embodiment is a five-layer arrangement containing an intermediate layer between the core layer and the sealant skin layer and an intermediate layer between the core layer and the outer layer.

The intermediate layer may comprise polypropylene, a polypropylene copolymer, an impact polypropylene, an (isotactic propylene)-ethylene heterophasic copolymer, inorganic filler(s), and optionally beta-crystal nucleator of polypropylene.

The film layers in accordance with the present invention can include one or more additives used in the film art. For example, fillers (organic or inorganic), pigments, stabilizers, UV absorbers, slip agents, antistatic agents, antiblock agents, and etc.

The inorganic fillers may be located in the core layer or in the intermediate layers when present, such as in a five layer film. The inorganic fillers preferably are at least one of $CaCO_3$, $BaCO_3$, clay, talc, silica, mica and $TiO_2$. The organic fillers may be preferably located in the core layer. The organic fillers preferably are at least one of a polybutylene terephthalate, a polyamide, a polyethylene terephthalate, a cyclic olefin copolymer, a polystyrene, and a syndiotactic polystyrene.

In summary, the sealable multi-layer films produced according to the present invention may be used with particular advantage for the manufacture of non-transparent packages for various materials such as light-sensitive foodstuffs, particularly where moisture permeability is desired. Additionally, the films may be used for other packaging purposes where non-transparent polymeric films are required. Due to the high gas and moisture transmission rates of the subject sealable multi-layer films, the films may be used for other packaging purposes and for medical applications where breathable films are required.

The present invention will be further described with reference to the following nonlimiting examples.

EXAMPLE 1

A three-layer oriented opaque film, A/B/C, is made by tenter frame orientation at 4 times in machine direction (MD) orientation and 6 times in transverse direction (TD) orientation.

The C layer is a copolymer of ethylene-propylene, FINA 8573 from Fina Oil and is about 1 μm polygauge thickness.

The B-layer is the core layer and is a blend comprising 30 wt. % of (isotactic propylene)-ethylene heterophasic copolymer, BASELL 8523 from Basell Company, and 70 wt. % of a masterbatch of polypropylene homopolymer and beta-crystal nucleators of polypropylene, BEPOL 022SP from Sunoco Chemicals. The B-layer is about 30 μm polygauge thickness.

The-A layer is about 2 μm polygauge thickness and comprises the same blend as the core layer.

The film has WVTR of about 96 $g/m^2$/day and the light transmission is about 9.1%.

EXAMPLE 2

A three-layer oriented opaque film, A/B/C, is made by tenter frame orientation at 4 times in MD orientation and 7 times in TD orientation.

The C-layer is a terpolymer of ethylene-propylene-butene-1, CHISSO 7510 from Chisso Corporation, Japan and is about 1 μm polygauge thickness.

The B-layer is a core layer and is a blend comprising 30 wt. % of isotactic propylene)-ethylene heterophasic copolymer BASELL 8573 from Basell Company, and 70 wt. % of a masterbatch of polypropylene homopolymer and beta-crystal nucleator of polypropylene, BEPOL 022SP from Sunoco Chemicals. The B-layer is about 30 μm polygauge thickness.

The A-layer comprises the same blend as the core layer and is about 2 μm polygauge thickness.

The film has a WVTR of about 80 g/m$^2$/day and the light transmission is about 12.1%.

EXAMPLE 3

A three layer oriented opaque film, A/B/C, is made by tenter frame orientation at 4 times in MD orientation and 8 times in TD orientation.

The C layer is a terpolymer of ethylene-propylene-butene-1, CHISSO 7701, from Chisso Corporation, Japan, and is about 0.5 μm polygauge thickness.

The B-layer is a blend comprising 30 wt. % of (isotactic propylene)-heterophasic copolymer, BASELL 8523 from Basell Company, and 70 wt. % of a masterbatch of polypropylene homopolymer and beta-crystal nucleators of polypropylene, BEPOL 022SP from Sunoco Chemicals, and is about 30 μm polygauge thickness.

The A-layer is an impact polypropylene masterbatch with beta-crystal nucleators of polypropylene and is about 2 μm polygauge thickness.

The film has WVTR about 290 g/m$^2$/day and the light transmission is about 7%.

EXAMPLE 4

A three-layer oriented opaque film, A/B/C, is made by tenter frame orientation at 4 times in MD orientation and 8 times in TD orientation.

The C-layer is a terpolymer of ethylene-propylene-butene, CHISSO 7701, from Chisso Corp., Japan, and is about 0.5 μm polygauge thickness.

The B-layer is a blend comprising 64 wt. % of isotactic polypropylene, FINA 3371, from Fina Oil, 30 wt. % of impact polypropylene masterbatch with beta-crystal nucleator of polypropylene, BI4020SP from Sunoco Chemicals, and 6 wt. % of CaCO$_3$, and is about 30 μm polygauge thickness.

The A-layer is an impact polypropylene masterbatch with beta-crystal nucleator of polypropylene, BI4020SP, from Sunoco Chemicals, and is about 2 μm polygauge thickness.

The film has WVTR about 150 g/m$^2$/day and the light transmission is about 7%.

EXAMPLE 5

A three layer oriented opaque film, A/B/C, is made by tenter frame orientation at 4 times in MD orientation and 8 times in TD orientation.

The C-layer is a metallocene plastomer, EXACT 3024, from ExxonMobil Chemicals and is about 2 μm polygauge thickness.

The B-layer is a blend comprising 60 wt. % of polypropylene, FINA 3371, from Fina Oil, and 40 wt. % of impact polypropylene masterbatch with beta-crystal nucleators of polypropylene, BI4020SP, from Sunoco chemicals, and is about 27.5 μm polygauge thickness.

The A-layer is impact polypropylene masterbatch with beta-crystal nucleator of polypropylene and is about 1 μm polygauge thickness.

The film has WVTR about 7 g/m$^2$/day and the light transmission is about 16%.

EXAMPLE 6

A three layer biaxial oriented opaque film, A/B/C, is made by tenter frame orientation at 4 times in MD orientation and 8 times in TD orientation.

The C-layer is a propylene-ethylene copolymer, FINA 8573, from Fina Oil Company and is about 1.25 μm thickness.

The core layer-B is a blend comprising 24 wt % of polypropylene, FINA 3371, from Fina Oil, 5 wt % of (isotactic propylene)-ethylene heterophasic copolymer, BASELL 8523 from Basell Company, 65 wt % of polypropylene masterbatch with beta-crystal nucleator of polypropylene, BEPOL 022SP from Sunoco Chemicals, and 6 wt % of polybutylene terephthalate from Ticona Company, and is about 30 μm thickness.

The A-layer is an impact polypropylene masterbatch with beta-crystal nucleator of polypropylene, BI4020TSP from Sunoco Chemicals, and is about 2 μm thickness. A corona treatment was applied on the outer surface of A-layer.

The film has WVTR about 84 g/m$^2$/day and the light transmission is about 7%.

EXAMPLE 7

A five layer biaxial oriented opaque film, P/Q/R/Q/S, is made by tenter frame orientation at 4 times in MD orientation and 8 times in TD orientation.

The S-layer is a propylene-ethylene-butene-1 terpolymer, CHISSO 7701, from Chisso Corporation, Japan, and is about 1 μm thickness.

The Q-layer is a blend comprising 60 wt % of polypropylene masterbatch with beta-crystal nucleator of polypropylene, BEPOL 022SP, from Sunoco Chemicals, and 40 wt % of impact polypropylene masterbatch with beta-crystal nucleator of polypropylene, BI4020SP, from Sunoco Chemicals, and is about 3 μm thickness.

The core layer-R is a blend comprising 60 wt % of polypropylene, PP4612, from ExxonMobil Chemicals, and 40 wt % of impact polypropylene masterbatch with beta-crystal nucleator of polypropylene, BI4020SP, from Sunoco chemicals, and is about 25 μm thickness.

The core layer-R is a blend comprising 60 wt % of polypropylene, PP4612, from ExxonMobil Chemicals, and 40 wt % of impact polypropylene masterbatch with beta-crystal nucleator of polypropylene, BI4020SP, from Sunoco chemicals, and is about 25 μm thickness.

The film has WVTR about 8 g/m$^2$/day and the light transmission is about 13.5%.

EXAMPLE 8

A five layer biaxial oriented opaque film, P/Q/R/Q/S, is made by tenter frame orientation at 4.1 times in MD orientation and 8 times in TD orientation.

The S-layer is an ethylene vinylacetate copolymer, ELVAX 3130SB, from E. I. DuPont, and is about 1 μm thickness.

The Q-layer is a blend comprising 30 wt % of polypropylene, FINA 3371, from Fina Oil Company, 40 wt % of polypropylene masterbatch with beta-crystal nucleator of polypropylene, BEPOL 022SP, from Sunoco Chemicals, and 30 wt % of (isotactic propylene)-ethylene heterophasic copolymer, BASELL 8523, from Basell Company, and is about 2.5 μm thickness.

The core layer-R is a blend comprising 65 wt % of polypropylene, PP4612, from ExxonMobil Chemicals, 30 wt % of impact polypropylene masterbatch with beta-crystal nucleator of polypropylene, BI4020SP, from Sunoco Chemicals, and 5 wt % of (isotactic propylene)-ethylene heterophasic copolymer, BASELL 8523, from Basell Company, and is about 17.5 μm thickness.

The P-layer is a propylene-ethylene copolymer, FINA 8573 HB, from Fina Oil company, and is about 1.25 μm thickness.

The film has light transmission about 25%.

EXAMPLE 9

A five layer biaxial oriented opaque film, P/Q/R/Q/S, is made by tenter frame orientation at 4.1 times in MD orientation and 8 times in TD orientation.

The S-layer is a propylene-ethylene-butene-1 terpolymer, CHISSO 7880, from Chisso Corporation, Japan, and is about 1 μm thickness.

The Q-layer is a blend comprising 30 wt % of polypropylene, FINA 3371, from Fina Oil Company, 40 wt % of polypropylene masterbatch with beta-crystal nucleator of polypropylene, BEPOL 022SP, from Sunoco Chemicals, and 30 wt % of (isotactic propylene)-ethylene heterophasic copolymer, BASELL 8523, from Basell Company, and is about 2.5 μm thickness.

The core layer-R is a blend comprising 20 wt % of polypropylene, PP4612, from ExxonMobil Chemicals, 40 wt % of polypropylene masterbatch with beta-crystal nucleator of polypropylene, BEPOL 022SP, 30 wt % of (isotactic propylene)-ethylene heterophasic copolymer, BASELL 8523, from Basell Company, and 10 wt % of HDPE masterbatch with $CaCO_3$, FC6080HD, from Schulman Company, and is about 17.5 μm thickness.

The P-layer is a propylene-ethylene copolymer, FINA 8573 HB, from Fina Oil Company, and is about 1.25 μm thickness.

The film has light transmission about 20%.

EXAMPLE 10

A five layer biaxial oriented opaque film, P/Q/R/Q/S, is made by tenter frame orientation at 4 times in MD orientation and 8 times in TD orientation.

The S-layer is a propylene-ethylene-butene-1 terpolymer, CHISSO 7880, from Chisso Corporation, Japan, and is about 1 μm thickness.

The Q-layer is a blend comprising 30 wt % of polypropylene, FINA 3371, from Fina Oil Company, 40 wt % of polypropylene, PP4612, from ExxonMobil chemicals, 26 wt % of (isotactic propylene)-ethylene heterophasic copolymer, BASELL 8523, from Basell Company, and 4 wt % of titanium dioxide from DuPont, and is about 2.5 μm thickness.

The core layer-R is a blend comprising 30 wt % of polypropylene, PP4612, from ExxonMobil Chemicals, 40 wt % of polypropylene masterbatch with beta-crystal nucleator of polypropylene, BEPOL 022SP, from Sunoco chemicals, and 30 wt % of (isotactic propylene)-ethylene heterophasic copolymer, BASELL 8523, from Basell Company, and is about 17.5 μm thickness.

The P-layer is a propylene-ethylene copolymer, FINA 8573HB, from Fina Oil Company, and is about 1.25 μm thickness.

The film has light transmission about 21%.

EXAMPLE 11

A five layer biaxial oriented opaque film, P/Q/R/Q/S, is made by tenter frame orientation at 4 times in MD orientation and 8 times in TD orientation.

The S-layer is a propylene-ethylene-butene-1 terpolymer, CHISSO 7880, from Chisso Corporation, Japan, and is about 1 μm thickness.

The Q-layer is a blend comprising 30 wt % of polypropylene, FINA 3371, from Fina Oil company, 40 wt % of polypropylene masterbatch with beta-crystal nucleator of polypropylene, BEPOL 022SP, from Sunoco Chemicals, 30 wt % of (isotactic propylene)-ethylene heterophasic copolymer, BASELL 8523, from Basell Company, and is about 2.5 μm thickness.

The core layer-R is a blend comprising 50 wt % of polypropylene, PP4612, from ExxonMobil Chemicals, 40 wt % of polypropylene masterbatch with beta-crystal nucleator of polypropylene, BEPOL 022SP, from Sunoco Chemicals, 5 wt % of (isotactic propylene)-ethylene heterophasic copolymer, BASELL 8523, from Basell Company, and 5 wt % of ethylene-propylene rubber, VISTALON 1703P, from ExxonMobil Chemicals, and is about 17.5 μm thickness.

The P-layer is a propylene-ethylene copolymer, FINA 8573 HB from Fina Oil company, and is about 1.25 μm thickness.

The film has light transmission about 24%.

EXAMPLES 12–15

A three-layer oriented opaque coextruded film, A/B/C, is made by tenter frame orientation at 4 times in MD orientation and 8 times in TD orientation.

The A-layer is impact polypropylene masterbatch with beta-crystal nucleator of polypropylene and is about 1 μm polygauge thickness.

The B-layer is a blend comprising 70 wt % of Polypropylene, FINA 3371, from Fina Oil, and 30 wt % of impact polypropylene masterbatch with beta-crystal nucleator of polypropylene, B14020SP, from Sunoco Chemicals, and is about 27.5 μm polygauge thickness.

The C-layer is a sealant layer and has about 1.5 μm polygauge thickness. Each of Examples 12–15 has a different composition for the C-layer.

For Example 12, the C-layer is EXACT 3131, a metallocene plastomer with density 0.900 g/cc, from ExxonMobil Chemical.

For Example 13, the C-layer is EXACT 4150, a metallocene plastomer with density 0.895 g/cc, from ExxonMobil Chemical.

For Example 14, the C-layer is ELVAX 3130SP, an EVA copolymer with 12% VA from E. I. DuPont.

For Example 15, the C-layer is ELVAX 3170SHB, which is an EVA copolymer with 18% VA from E.I. DuPont.

The three-layer oriented opaque coextruded film of Examples 12–15 were heat sealed, sealant layer on sealant layer, by a Wrap-Ade Crimp Sealer and tested for crimp seal strength by using a Suter Tester, which pulls the seal apart at a test speed of 12 in./min. The crimp seal test method is ASTM F88.

The data obtained is shown in the Table below.

| Crimp seal strength, (g/in) (20 psi, ¾ second dwell time) | | Seal Temperature (° C.) |
| --- | --- | --- |
| Example 12 | 230 | 77 |
| Example 13 | 300 | 71 |
| Example 14 | 235 | 71 |
| Example 15 | 330 | 66 |

While the invention has been described in detail and with reference to specific embodiments thereof, it will be apparent to one of ordinary skill in the art that various changes and modifications can be made therein without departing from the spirit and scope of the invention. The Examples recited herein are demonstrative only and are not meant to be limiting.

What is claimed is:

1. A sealable multi-layer opaque film comprising a core layer and at least one sealable skin layer,
    wherein said core layer comprises an orientation-enhancing polymer, a polypropylene homopolymer and at least one beta crystal nucleator of polypropylene,
    wherein said orientation-enhancing polymer comprises an (isotactic propylene)-ethylene heterophasic copolymer and at least one polymer selected from the group consisting of:
    an impact polypropylene polymer;
    an impact polypropylene copolymer;
    an ethylene-(isotactic propylene) rubber;
    a metallocene isotactic polypropylene;
    an isotactic polypropylene grafted with elastomer;
    a maleated-isotactic polypropylene;
    a blend of an isotactic polypropylene and a syndiotactic polypropylene;
    a blend of an isotactic polypropylene and an atactic polypropylene;
    a blend of an isotactic polypropylene and an acrylic elastomer;
    a blend of an isotactic polypropylene and an alkenic elastomer;
    a blend of an isotactic polypropylene, a polyethylene, and an ethylene-propylene rubber;
    a blend of an isotactic polypropylene and a polyisobutylene;
    a blend of an isotactic polypropylene and a styrenic elastomer,
    a blend of an isotactic polypropylene and a metallocene isotactic polypropylene copolymer; and
    a blend of an isotactic polypropylene and an isotactic propylene copolymer, and
    wherein said orientation-enhancing polymer does not comprise an ethylene-propylene block copolymer.

2. The sealable multi-layer opaque film of claim 1, wherein said polypropylene homopolymer is an isotactic polypropylene.

3. The sealable multi-layer opaque film of claim 2, wherein said isotactic polypropylene has m-pentad greater than 85% by NMR spectroscopy measurement.

4. The sealable multi-layer opaque film of claim 3, wherein said isotactic polypropylene comprises a mixture of at least two polypropylene polymers having different m-pentads.

5. The sealable multi-layer opaque film of claim 1, wherein said beta crystal nucleator of polypropylene comprises a mixture of an organic dibasic acid and an oxide, a hydroxide, or an acid salt of a Group II metal.

6. The sealable multi-layer opaque film of claim 1, further comprising an outer skin layer on the side of the core layer opposite to the sealable skin layer.

7. The sealable multi-layer opaque film of claim 6, wherein said outer skin layer comprises:
    at least one polymer selected from the group consisting of an impact polypropylene polymer, a polypropylene homopolymer, polypropylene copolymer, a metallocene polypropylene, a metallocene isotactic propylene copolymer and an (isotactic propylene)-ethylene heterophasic copolymer; and
    optionally, a beta crystal nucleator of polypropylene.

8. The sealable multi-layer opaque film of claim 6, wherein said outer skin layer comprises a material selected from the group consisting of:
    i) an impact polypropylene polymer and a beta crystal nucleator of polypropylene;
    ii) an (isotactic propylene)-ethylene heterophasic copolymer and a beta crystal nucleator of polypropylene;
    iii) a blend which is the same as the core layer; and
    iii) an impact polypropylene masterbatch with a beta crystal nucleator of polypropylene.

9. The sealable multi-layer opaque film of claim 6, further comprising at least one intermediate layer.

10. The sealable multi-layer opaque film of claim 6, further comprising at least two intermediate layers.

11. The sealable multi-layer opaque film of claim 1, wherein said sealable skin layer comprises a polymer selected from the group consisting of an ethylene-propylene-butene-1 terpolymer, an (isotactic propylene)-alpha olefin copolymer, a (syndiotactic propylene)-alpha olefin copolymer, an ethylene vinylacetate copolymer, an ethylene methacrylic acid copolymer, an ethylene acrylic acid copolymer, an ethylene methylacrylate acrylic acid terpolymer, an ethylene alkyl acrylate copolymer, an ionomer, a metallocene plastomer, a very low density polyethylene, an ethylene-(methyl acrylate)-(glycidyl methacrylate) terpolymer, and ethylene-(glycidyl methacrylate) copolymer.

12. The sealable multi-layer opaque film of claim 1, wherein said sealable skin layer comprises a material selected from the group consisting of:
    i) an ethylene-propylene-butene-1 terpolymer,
    ii) an ethylene-vinylacetate copolymer, and
    iii) a metallocene catalyzed plastomer.

13. The sealable multi-layer opaque film of claim 1, wherein said core layer comprises 1 to 99 wt. % of the polypropylene homopolymer, 99 to 1 wt. % of the orientation-enhancing polymer (based on total polymers) and 0.005 to 2 wt. % of the beta crystal nucleator for polypropylene.

14. The sealable multi-layer opaque film of claim 13, wherein said core layer comprises 10 to 90 wt. % of the polypropylene homopolymer, 90 to 10 wt. % of the orientation-enhancing polymer (based on total polymers) and 0.005 to 2 wt. % of the beta crystal nucleator for polypropylene.

15. The sealable multi-layer opaque film of claim 13, wherein said core layer comprises 30 to 70 wt. % of the polypropylene homopolymer, 70 to 30 wt. % of the orientation-enhancing polymer (based on total polymers) and 0.005 to 2 wt. % of the beta crystal nucleator for polypropylene.

16. The sealable multi-layer opaque film of claim 1, wherein said core layer thickness is at least 70% of the whole film thickness.

17. The sealable multi-layer opaque film of claim 1, wherein the sealable multi-layer opaque film is uniaxially oriented at from 3 to 10 times of orientation ratio.

18. The sealable multi-layer opaque film of claim 1, wherein the sealable multi-layer opaque film is biaxially oriented from 3 to 6 times of orientation ratio in the machine direction and 4 to 10 times of orientation ratio in the transverse direction.

19. The sealable multi-layer opaque film of claim 1, wherein the sealable multi-layer opaque film is made by coextrusion of the layers.

20. The sealable multi-layer opaque film of claim 1, further comprising an inorganic filler selected from the group consisting of $CaCO_3$, $BaCO_3$, clay, talc, silica, mica and $TiO_2$.

21. The sealable multi-layer opaque film of claim 1, wherein the core layer further comprises an organic filler selected from the group consisting of a polybutylene terephthalate, a polyamide, a polyethylene terephthalate, a cyclic olefin copolymer, a polystyrene, and a syndiotactic polystyrene.

22. The sealable multi-layer opaque film of claim 1, wherein said film has a light transmission of less than 35%.

23. The sealable multi-layer opaque film of claim 1, wherein said film has a light transmission of less than 30%.

24. The sealable multi-layer opaque film of claim 1, wherein said film has a light transmission of less than 25%.

25. The sealable multi-layer opaque film of claim 1, wherein said film has a water vapor transmission rate of greater than 4.0 $g/m^2/day$.

26. The sealable multi-layer opaque film of claim 1, wherein said film has a water vapor transmission rate of greater than 15.0 $g/m^2/day$.

27. The sealable multi-layer opaque film of claim 1, wherein said film has a water vapor transmission rate of greater than 50.0 $g/m^2/day$.

28. The sealable multi-layer opaque film of claim 1, wherein the sealable multi-layer opaque film has a heat seal strength greater than 200 g/in at a heat seat temperature below 82° C.

29. A packaged article, wherein the package comprises the sealable multi-layer opaque film of claim 1.

30. The sealable multi-layer opaque film of claim 1, wherein the beta crystal nucleator of polypropylene is not a red dye and the core layer has voids formed therein by the beta crystal nucleator of polypropylene.

* * * * *